United States Patent
Tseng

(10) Patent No.: US 6,202,009 B1
(45) Date of Patent: Mar. 13, 2001

(54) METHOD FOR DETECTING FAULT OF VEHICLE MOTION SENSORS

(75) Inventor: Hongtei Eric Tseng, Canton, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/218,285

(22) Filed: Dec. 22, 1998

(51) Int. Cl.$^7$ .................................................. G06F 7/00
(52) U.S. Cl. ........................ 701/34; 180/197; 180/199; 303/122; 303/122.05
(58) Field of Search ..................... 701/34, 35, 124, 701/80, 82, 72, 73, 63; 180/197, 199; 303/122, 122.05

(56) References Cited

U.S. PATENT DOCUMENTS

| | | |
|---|---|---|
| 3,809,867 | 5/1974 | Hattendorf . |
| 4,679,808 | 7/1987 | Ito et al. . |
| 4,690,431 | 9/1987 | Ito et al. . |
| 4,761,022 | 8/1988 | Ohashi et al. . |
| 4,788,773 | 12/1988 | Palsgard et al. . |
| 4,809,181 | 2/1989 | Ito et al. . |
| 4,872,116 | 10/1989 | Ito et al. . |
| 5,032,995 * | 7/1991 | Matsuda et al. ............... 701/34 |
| 5,058,017 | 10/1991 | Adachi et al. . |
| 5,123,497 | 6/1992 | Yopp et al. . |
| 5,212,640 * | 5/1993 | Masuda ............................ 701/34 |
| 5,311,956 | 5/1994 | Sugiyama . |
| 5,341,297 | 8/1994 | Zomotor et al. . |
| 5,446,658 | 8/1995 | Pastor et al. . |
| 5,627,756 | 5/1997 | Fukada et al. . |
| 5,654,906 | 8/1997 | Youngquist et al. . |
| 5,707,117 | 1/1998 | Hu et al. . |
| 5,842,143 * | 11/1998 | Lohrenz et al. ................ 701/34 |

OTHER PUBLICATIONS

"VDC Systems Development And Perspective", by Anton T. vanZanten et al, SAE Technical Paper No. 980235, Feb. 23–26, 1998, pp. 9–30.

* cited by examiner

Primary Examiner—William A. Cuchlinski, Jr.
Assistant Examiner—Yonel Beaulieu
(74) Attorney, Agent, or Firm—Gregory P. Brown; Roger L. May

(57) ABSTRACT

A method for detecting fault in vehicle motion sensors for a motor vehicle includes providing a measured lateral acceleration signal and yaw rate signal. The method further includes calculating, respectively, a first and second road bank angle estimate based on these signals. Also included is determining a first and second maximum road bank angle based on the first and second road bank angle, respectively, and calculating a first and second threshold based on these values. The method further includes comparing whether the first and second road bank angles exceeds the second and first thresholds, respectively, and if so, indicating either one or both a lateral acceleration signal fault or yaw rate signal fault.

12 Claims, 4 Drawing Sheets

METHOD FOR DETECTING FAULT OF VEHICLE MOTION SENSORS

FIELD OF THE INVENTION

The present invention relates generally to a fault detection for vehicle motion sensors. More particularly, the present invention relates to an active brake control system with the capability to detect a fault in a vehicle motion sensor.

BACKGROUND OF THE INVENTION

Disclosure Information

Automotive vehicles having vehicle control systems typically include vehicle motion sensors which serve to trigger the actuation of the active brake control system when a fault signal or condition is detected. Further, a vehicle motion sensor fault may often invalidate the wheel speed information by triggering the actuation of the active brake control system, thereby resulting in undesired vehicle braking. Moreover, speed differences across wheel speed sensors are sensitive to the braking control system actuation and are thus poor sources for the reproduction of vehicle motion signal in the even of a sensor fault. Therefore, it is desirable to detect a motion sensor fault which is insensitive to wheel braking actuation, and which is also independent of the differences across wheel speed sensors, left versus right.

While U.S. Pat. No. 5,707,117 addresses the issue of a fault detection for an active brake control diagnostic, it is based on wheel speed differences between left and right wheels, which has the aforementioned disadvantages.

Therefore, it would be desirable to provide a method for detecting fault in a vehicle control system that is insensitive to wheel braking actuation, and independent of wheel speed differences. The method should also be able to detect fault independent of the specific fault type and also detect fault that is otherwise not detectable by checking electrical specifications.

SUMMARY OF THE INVENTION

There is disclosed herein a method for detecting fault of vehicle motion sensors, and particularly the yaw rate sensor and the lateral acceleration sensor. According to the present invention, in order to detect fault in these sensors, correlations are made based on the vehicle model, between steering wheel angle and yaw rate, and also between steering wheel angle and lateral acceleration. The aforementioned correlations between steering wheel angle and yaw rate, and between steering wheel angle and lateral acceleration, have a physical sense which is defined as the road bank angle estimate. The present invention also uses signals insensitive to differences between wheel speed sensors and wheel braking actuation. In a preferred embodiment, an additional vehicle stability verification is made of the lateral accelerometer fault detection method to provide for a more robust fault detection system.

The method for detecting fault in vehicle motion sensors for a motor vehicle includes providing a measured lateral acceleration signal and calculating a first estimated value, corresponding to an estimated first road bank angle, and which is based on the lateral acceleration signal. The method also includes providing a measured yaw rate signal and calculating a second estimated value, corresponding to an estimated second road bank angle, based on the yaw rate signal. Further, the method includes determining a first maximum road bank angle based on the first road bank angle, and determining a second maximum road bank angle based on the second road bank angle. The method further includes calculating a first threshold based on the first maximum road bank angle and calculating a second threshold based on the second maximum road bank angle.

Moreover, the present method includes comparing whether the first road bank angle estimate exceeds the second threshold, and if so, indicating a lateral acceleration signal fault. The method also includes comparing whether the second road bank angle estimate exceeds the first threshold, and if so, indicating a yaw rate signal fault.

In one preferred embodiment according to the present invention, the step of determining the maximum first road bank angle includes calculating a rolling maximum first road bank angle which is continuously updated in a predetermined time period; and also the step of determining the maximum second road bank angle includes calculating a rolling maximum second road bank angle which is continuously updated in a predetermined time period. In yet another preferred embodiment of the disclosed method, included is providing a steering wheel angle signal, and calculating the first and second bank angles using the steering wheel angle signal.

In a most preferred embodiment of the method disclosed herein, the lateral acceleration check includes determining whether the vehicle is stable by a function which may be characterized as product of (a) the difference between a front slip angle and a rear slip angle and (b) its time rate of change, wherein the vehicle is determined to be stable when the product is less than a calibrated threshold.

And still in yet another preferred embodiment of this method according to this application, the step of comparing whether the first road bank angle exceeds the second threshold includes generating a first counter increment when the first bank angle exceeds the second threshold, and indicating a lateral acceleration signal fault when the first counter exceeds a predetermined first counter threshold. Similarly, the step of comparing whether the second road bank angle exceeds the first threshold includes generating a second counter increment when the second bank angle exceeds the first threshold, and indicating a yaw rate signal fault when the second counter exceeds a predetermined second counter threshold.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
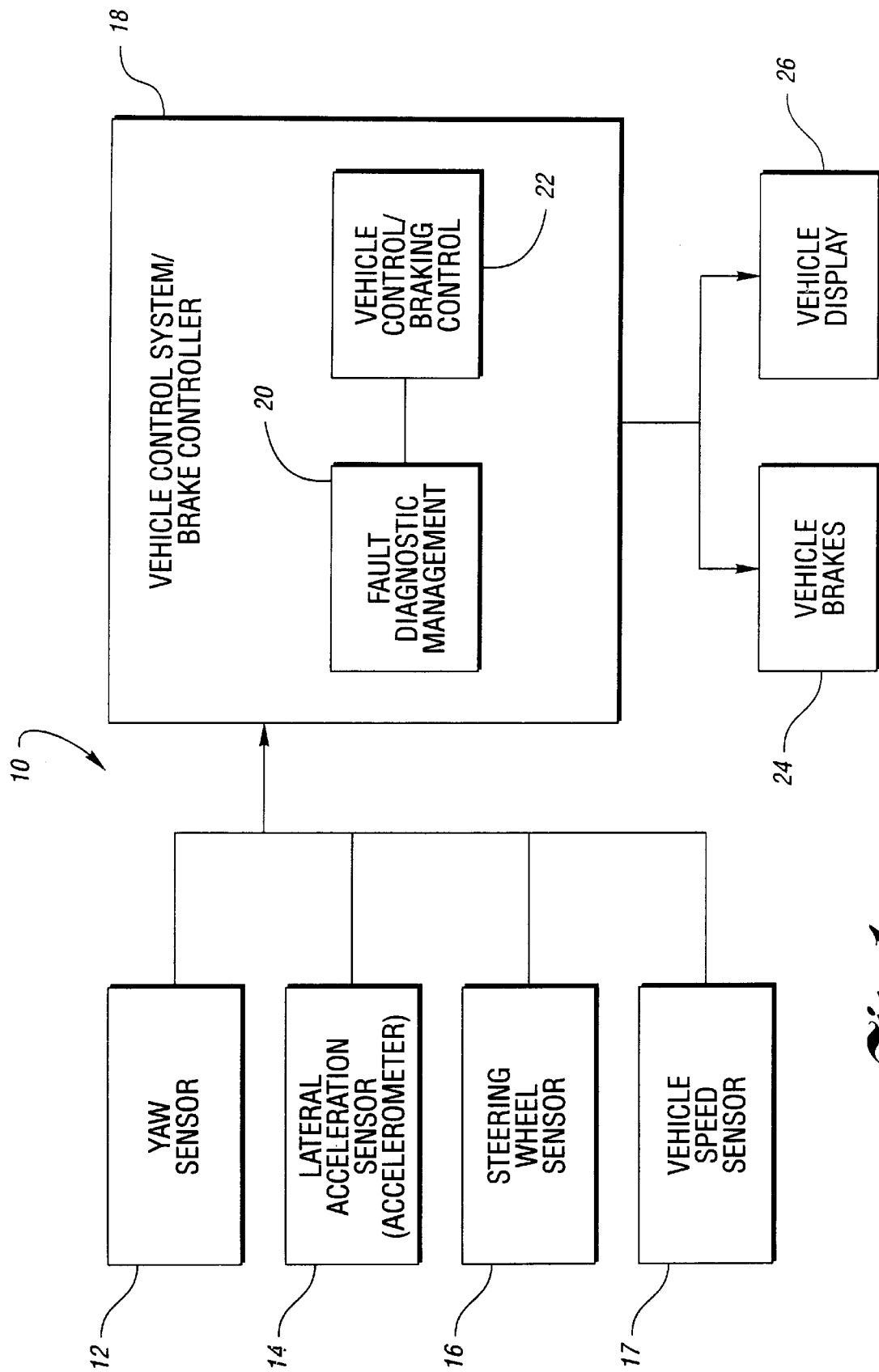
FIG. 1 is a schematic block diagram of a vehicle control system according to the present invention.

With reference to FIG. 1 of the drawings, a schematic block diagram is illustrated of a vehicle control system 10 for detecting fault of vehicle motion sensors according to the present invention. System 10 includes a brake controller 18 which receives data from a yaw sensor 12, vehicle lateral acceleration sensor (accelerometer) 14, steering wheel angle sensor 16, and a vehicle speed sensor 17, for performing its fault detection analysis. Although not illustrated, other sensors and accelerometers could be used instead of those described and illustrated herein, depending on the system being controlled and the available system sensor set while still making use of the present invention. For example, the data and information for the vehicle longitudinal speed sensor 17 may be obtained from wheel speed sensors as a whole and does not rely on the differences across wheel speed sensors, for example between left and right wheel speed sensors.

Brake controller 18, via the method disclosed herein, uses the data from sensors 12, 14, 16, and 17, to detect fault in the vehicle motion sensors, and in particular yaw sensor 12 and lateral acceleration sensor 14.

Figure 4:
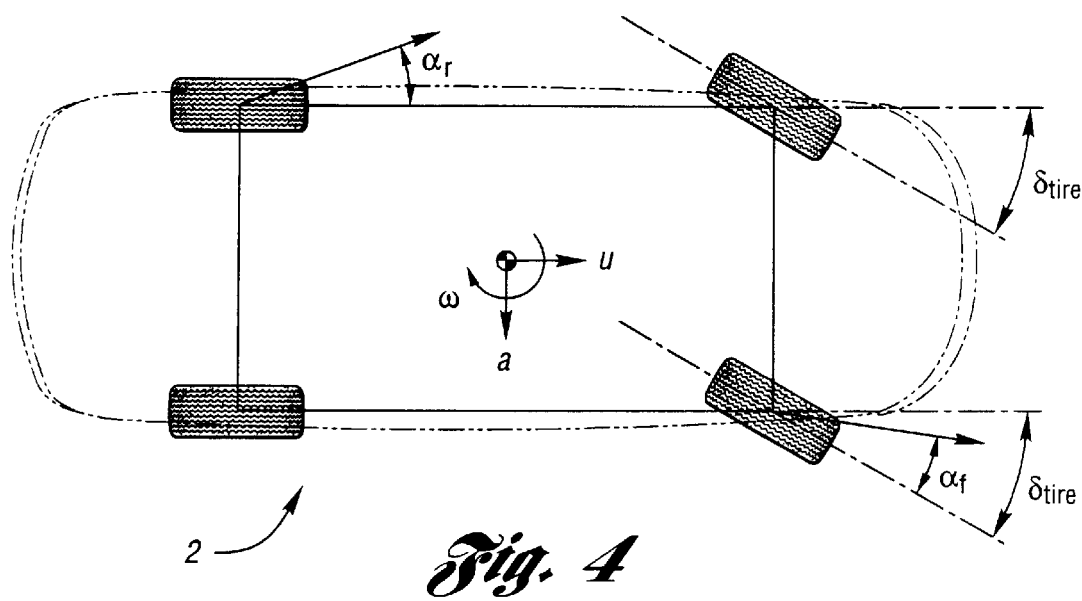
FIG. 4 is a top plan view of a motor vehicle illustrating various operating parameters of a vehicle incorporating the motion sensors fault detection according to the present invention.
Figure 5:
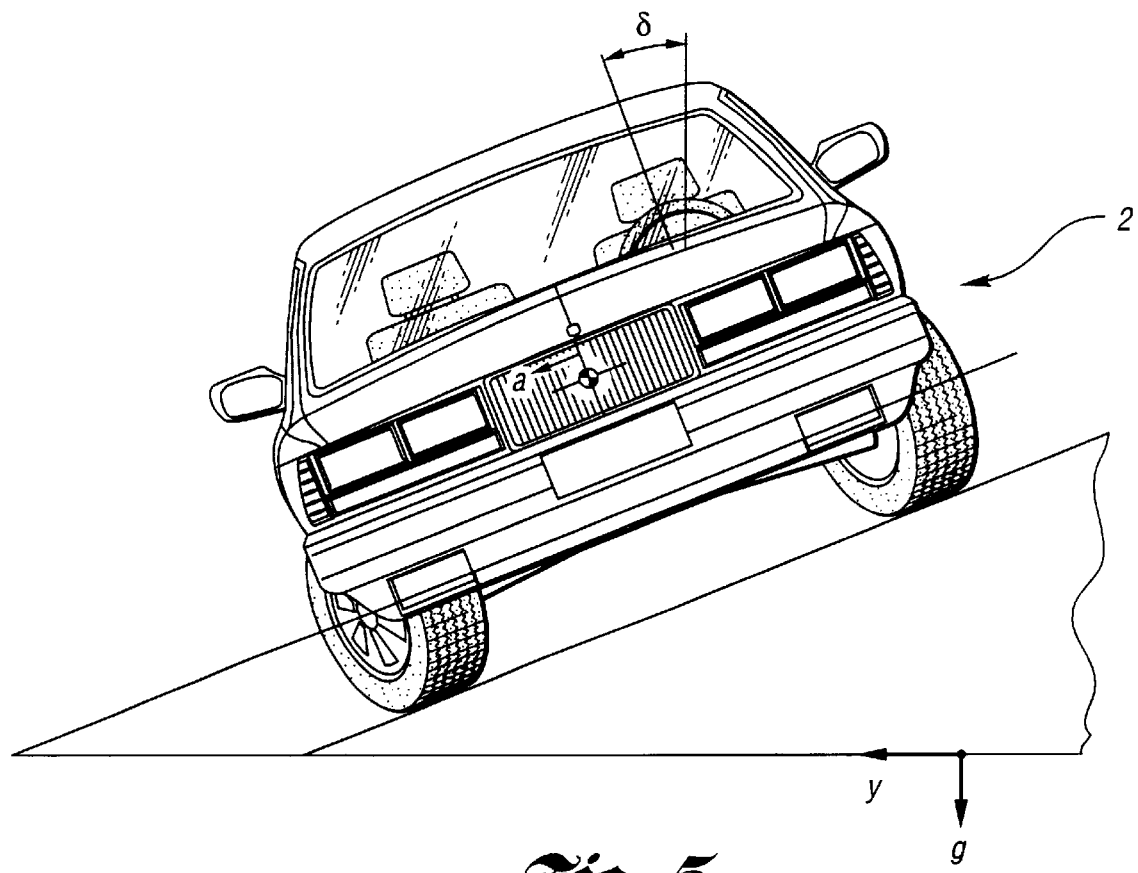
FIG. 5 is a front view of a motor vehicle the motor vehicle illustrated in FIG. 4.

With reference to FIGS. 4 and 5 of the drawings, various operating parameters and variables used according to the present invention as disclosed herein are illustrated as they relate to a ground based motor vehicle 2. Those skilled in the art will recognize the basic physics represented by these illustrations, and these parameters are described in greater detail herein.

In keeping with the present invention, brake controller 18 calculates two estimated values, which are estimates of road bank angles, and which provide a physical sense to the data generated by sensors 12, 14, 16, and 17. The first road bank angle estimate γ(swa,vel,lat.acc.) is designed to cross check the steering wheel and yaw rate measurements. This first road bank angle estimate is based on vehicle dynamics and is calculated using steering wheel angle (swa or δ) which is generated by steering wheel sensor 16, lateral acceleration of the vehicle (lat.acc. or a) which is generated by accelerometer 14, and vehicle longitudinal speed (vel or u) which is generated by vehicle speed sensor 17, according to the following relationship:

$$\hat{\gamma}_a = \gamma(swa, vel, lat.acc.) \qquad (1)$$

where $$\hat{\gamma}_a = A_1^{-1}(a - A_2 \delta) \qquad (2)$$

and where
$\hat{\gamma}_a$ bank angle estimate based on measured lateral acceleration;
$A_1$=a transfer function relating bank angle to vehicle lateral acceleration, e.g., $$A_1 = \frac{-gL}{L + Ku^2}; \qquad (3)$$

$A_2$=a transfer function relating steering wheel angle to vehicle lateral acceleration, e.g., $$A_2 = \frac{Gu^2}{L + Ku^2}; \qquad (4)$$

G=steering ratio relating actual tire angle, $\delta_{tire}$, to steering wheel angle, δ;

K =calibrated coefficient related to specific vehicle handling characteristics;
δ=steering wheel angle; and
L=wheel base.

The second road bank angle estimate, γ(swa,vel,yaw), is designed to cross check the steering wheel angle and lateral acceleration measurement. This second road bank angle estimate is based on the vehicle dynamics and is calculated using steering wheel angle (swa or δ), vehicle speed (vel or u), and yaw rate (yaw or ω), according to the following relationship:

$$\hat{\gamma}_\omega = \gamma(swa, vel, yaw) \qquad (5)$$

where:

$$\hat{\gamma}_\omega = B_1^{-1}(\omega - B_2 \delta) \qquad (6)$$

and where:
$\hat{\gamma}_\omega$=bank angle estimate based on measured yaw rate;
$B_1$=a transfer function relating bank angle to vehicle yaw rate, e.g., $$B_1 = \frac{gKu}{(L + Ku^2)}; \qquad (7)$$

and $B_2$=a transfer function relating steering wheel angle to vehicle yaw rate, e.g., $$B_2 = \frac{Gu}{L + Ku^2}. \qquad (8)$$

With further reference to FIG. 1, vehicle control system 18 also includes a fault diagnostic management 20, which performs much of the method disclosed herein, including calculations, comparisons, data storage, varied decision making, and other functions to perform the method according to the present invention. Fault diagnostic management 20 also includes a counter as is disclosed further herein in association with the method according to the present invention. Fault diagnostic management 20 is also in communication with a vehicle braking/control actuation module 22, which controls vehicle brakes 24 and vehicle display 26 based on the results of the method disclosed herein.

Figure 2:
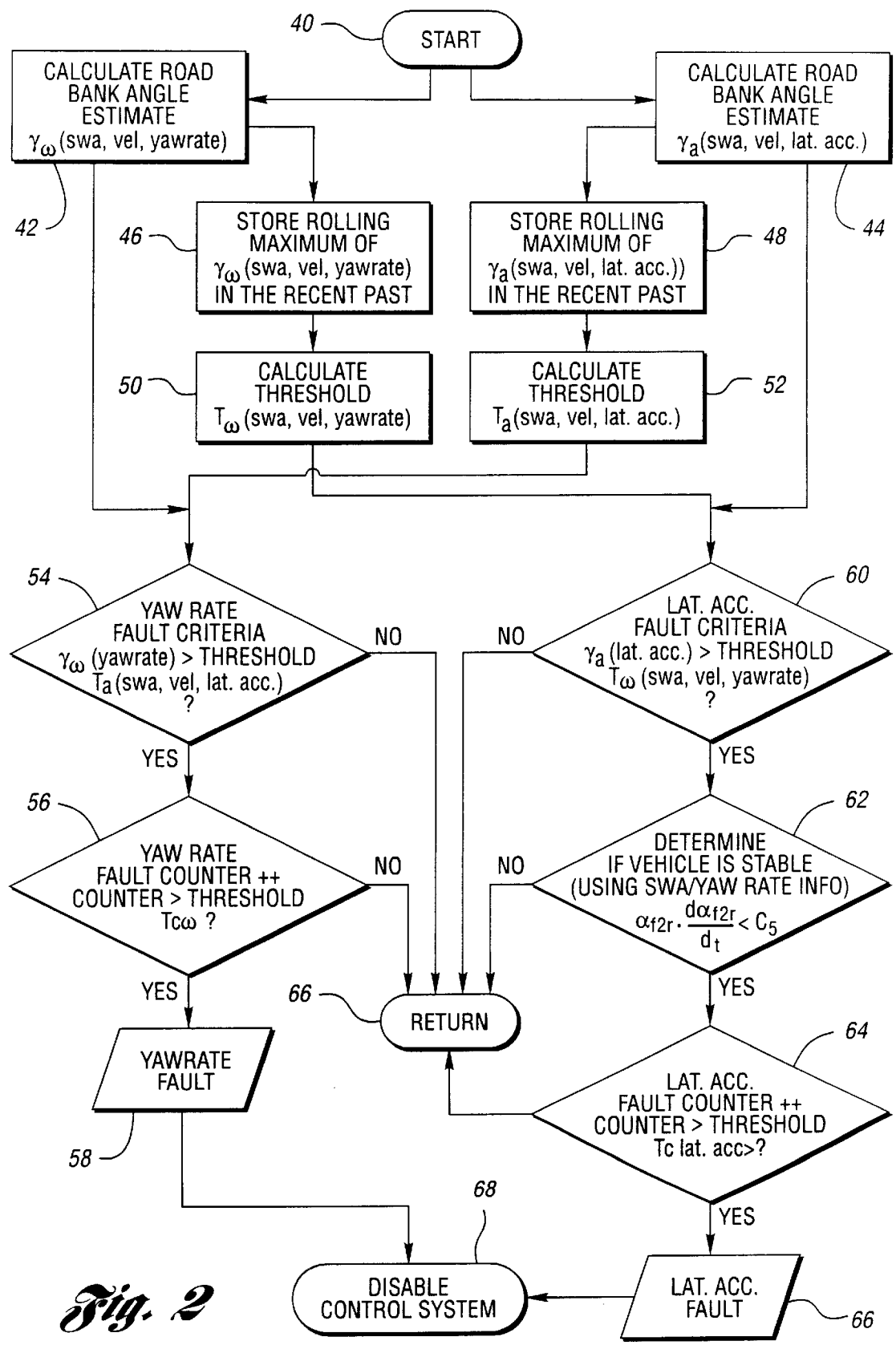
FIG. 2 is a flow diagram for a fault detection system method according to the present invention.

With reference to FIG. 2 of the drawings, a flow diagram of a fault detection method according to the present invention is provided, starting at block 40. As shown in block 44, brake controller 18, and particularly fault diagnostic management 20, calculates the first road bank angle estimate (see equation No. 2) based on lateral acceleration data, $$\hat{\gamma}_a$$

as heretofore described. In a corresponding manner, as shown in block 42, brake controller 18 calculates a second road bank angle estimate, $$\hat{\gamma}_\omega$$

based on yaw rate data, as heretofore described.

Next, as shown in block 48, brake controller 18 stores a rolling maximum of the value $$\hat{\gamma}_a$$

calculated in block 44 in a predetermined or precalibrated time period, which is preferably one (1) second. Similarly, with reference to block 46, brake controller 18 stores a rolling maximum of the value $$\hat{\gamma}_\omega$$

calculated in block 42 in a predetermined/calibrated time period, preferably one second.

Thus, referring again to blocks 46 and 48 of FIG. 2, as each of the road bank angle estimates, $\gamma_{107}$ and $\gamma_\alpha$, respectively, is calculated, the maximum for each is stored and is updated as a larger value (i.e. a new maximum value) is generated in the predetermined time period. Thus, by the term rolling maximum indicates that the "old" maximum value is discarded in place of a "new" maximum value in a continuous verification process.

Next, block 50 uses the output of block 46, which is a variable related to recent steering wheel, yaw rate and vehicle speed information, to form a vehicle dynamics/road disturbances state dependent threshold ($T_\omega$). This threshold is lateral acceleration independent and thus is intended for lateral accelerometer sensor 14 check. $T_\omega$ is calculated using the stored rolling maximum $$\hat{\gamma}_\omega$$

output of block 46 according to the following relationship:

$$\text{Threshold } T_\omega = \max\left[\left|\frac{A_1}{B_1 u}\right| |\hat{\gamma}_\omega| c_3, |A_1^{-1}| c_4\right] \quad (9)$$

where $C_3$ and $C_4$ are calibrated constants. Similarly, block 52 reflects a second threshold $T_a$ which is a vehicle dynamics/road disturbances state dependent threshold which is yaw rate independent and, therefore, is intended for yaw rate sensor 12 check, which is calculated using the stored rolling maximum $$\hat{\gamma}_a$$

output of block 48, which is a variable related to recent steering wheel, lateral acceleration, and vehicle speed information according to the following relationship:

$$\text{Threshold } T_a = \left[\left|\frac{B_1 u}{A_1}\right| |\hat{\gamma}_a| c_1 + |B_1^{-1}| u^{-1} c_2\right] \quad (10)$$

where $C_1$ and $C_2$ are calibrated constants.

With reference now to block 54, the bank angle calculated based on yaw rate, $$\hat{\gamma}_\omega$$

from block 42 is compared to the threshold $T_a$ based on lateral acceleration from block 52. With further reference to block 54, if the output of block 42, $$\hat{\gamma}_\omega$$

is excessive and greater than the threshold $T_a$ obtained in block 52, it is shown in block 56 that a fault counter is triggered, and an increment is registered with counter, thereby increasing the possibility of a fault diagnosis of yaw rate sensor 12. As shown in block 56, If the value of counter exceeds a precalibrated counter threshold $T_{c\omega \text{ for yaw rate}}$, a yaw rate signal fault flag is triggered and a yaw rate sensor 12 fault is indicated as shown in block 58. The control system 18 is then shut down until reset, shown in block 68.

So if either bank angle exceeds the threshold to which it is compared, there may be a possible sensor fault with further verification, as described further herein. For example, if yaw rate road bank angle $\gamma_\omega$ exceeds the value for $T_a$, there could be a yaw rate sensor signal fault.

Similarly in block 60, for the lateral acceleration checking criteria, if road bank angle $\gamma_a$ due to lateral acceleration exceeds threshold, $T_\omega$ (which is independent of lateral acceleration, but dependent of vehicle maneuver and road disturbance), the possibility is increased that lateral acceleration sensor 14 is faulty. This is verified as shown in block 64, where counter records or registers each time $\gamma_a$ exceeds $T_\omega$. When the value of counter exceeds a predetermined value of counter threshold $T_{c\text{ }lat.acc.}$ for lateral acceleration, the lateral acceleration sensor 14 fault flag is indicated as shown in block 66 and the system is then shut down. With reference to block 62 and its associated text which are discussed further herein, in a preferred embodiment, the lateral acceleration sensor 14 fault diagnosis check is performed in conjunction with a vehicle stability condition check.

It is contemplated that a detected fault (see blocks 58 and 60) in yaw rate sensor 12 and/or lateral accelerometer 14, respectively, according to the present invention is registered and thereby shuts down control system 18 until it is reset (as shown in block 68) at the next key-on or ignition cycle. An indicator is also provided to the driver, preferably via the vehicle display 26 shown in FIG. 1, to warn the driver via a light indicator or sound indicator or other type of indicator, that the corresponding system has been shut down.

With reference to block 52 and its associated equation No. 10, note that the detection sensitivity of the yaw rate sensor 12 fault increases as the vehicle speed increases. This is shown by reference to block equation No. 10. With a focus on the second term of equation No. 10, it shows the product of the inverse longitudinal speed ($u^{-1}$) and a constant $C_2$. Because $C_2$ is a calibrated constant, as vehicle speed increases, the second term decreases, and accordingly the threshold $T_a$ decreases. This increased sensitivity to fault detection is desired as the vehicle speed increases, as long as the fault detection remains robust. By "robust," it is insensitive to these road disturbances or vehicle maneuvers.

As previously discussed, if the output of block 44, $$\hat{\gamma}_a$$

is excessive and greater than the threshold $T_\omega$ calculated in block 50, block 64 indicates that a counter indicating a possible fault of lateral acceleration sensor 14 is increased. This lateral acceleration check is preferably performed under a vehicle stable condition check represented by block 62.

Accordingly, in a preferred embodiment according to the present invention, the method for fault detection of lateral acceleration sensor 14 includes an additional vehicle stability check criteria which is provided and shown in FIG. 2 as block 62. This additional vehicle stability check criteria indicates whether the vehicle is stable or not, as described further herein. Therefore, in keeping with the teachings according to the present invention, block 62 confirms whether the lateral acceleration criteria is exceeded during a stable maneuver, because threshold $T_a$ or lateral acceleration fault criteria may be violated if the vehicle dynamics/maneuvering is excessive. The method disclosed herein is a robust method in terms of avoiding false diagnosis. Thus, vehicle stability criteria is verified based on steering wheel angle, vehicle speed, and yaw rate according to the following relationship:

$$\alpha_{f2r} \cdot \frac{d\alpha_{f2r}}{dt} < c_5 \qquad (11)$$

where $$\alpha_{f2r} := \alpha_f - \alpha_r = G\delta - \frac{L\omega}{u}; \qquad (12)$$

and where $C_5$=a calibrated constant; and $\alpha_{f2r}$=the difference between the vehicle front slip angle and rear slip angle.

Although slip angle is not directly measurable and may be difficult to estimate, the difference between the front and rear slip angles has a cancel-out effect such that it is dependent on steering wheel angle, yaw rate and vehicle speed, which are directly measurable. The product of this front to rear slip angle difference and its rate of change is used to indicate whether the vehicle maneuver is reasonable (see equation No. 11). Moreover, because the input for equation No. 11 is directly measured, no estimation is necessary. The term stable as used in conjunction with the verification of block 62 is a general indication that the relevant vehicle maneuver (i.e. side slip, etc.) is not excessive.

Accordingly, if the vehicle is indicated to be stable (via block 62), and the threshold fault criteria is violated (block 60), then we may conclude that lateral acceleration sensor 14 is at fault. After a predetermined number of loops has concluded the same result (block 64), a fault detection flag is triggered in lateral acceleration sensor 14 (block 66) and a lateral acceleration sensor 14 fault is identified.

Figure 3:
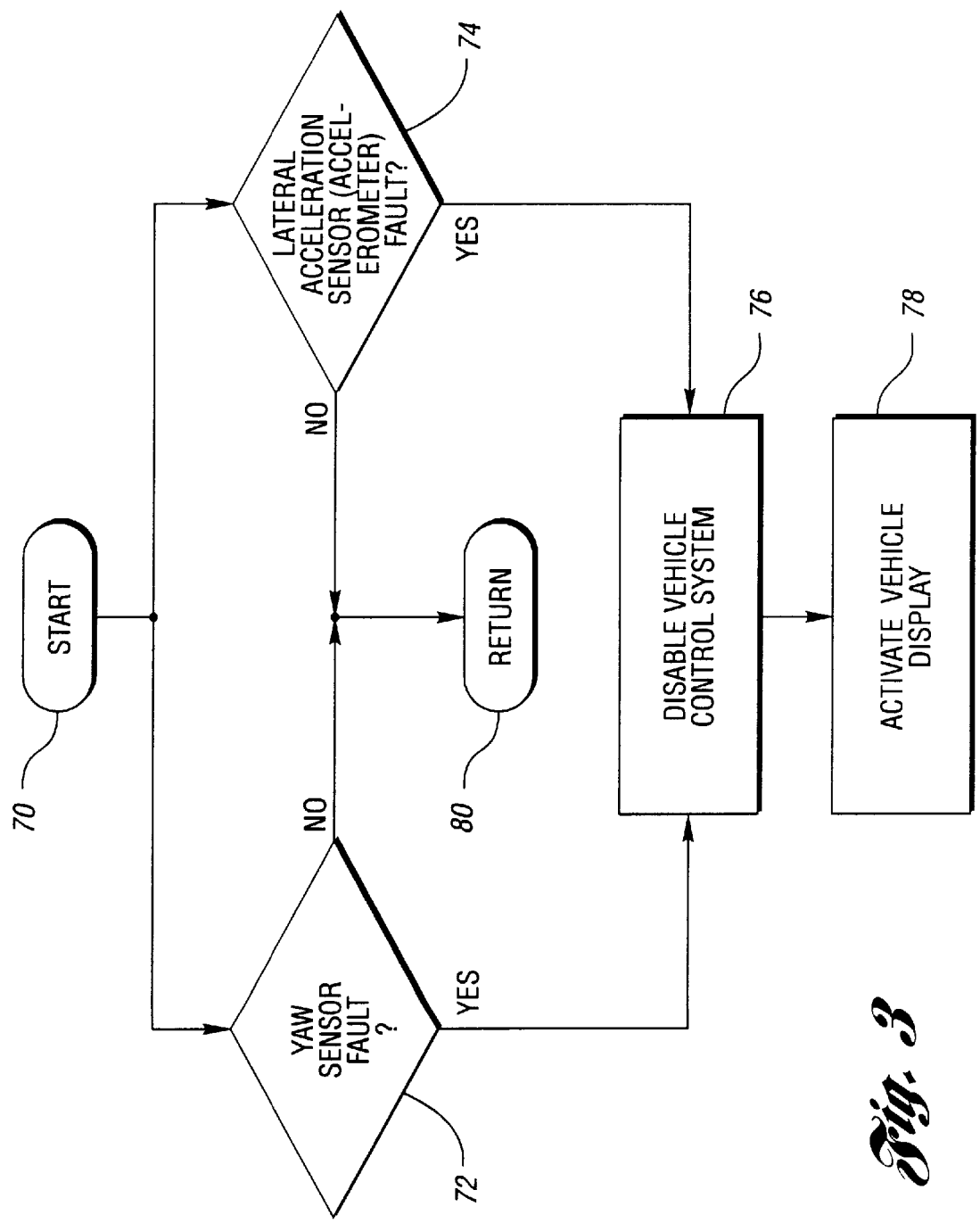
FIG. 3 is a flow block diagram for a vehicle control system having method for detecting fault according to the present invention.

Referring now to FIG. 3, shown therein is a flow diagram of a vehicle control system/active brake control system 18 (as illustrated in FIG. 1) which is adapted to use the information derived from the present invention and also use the method according to the present invention. Starting at block 70, vehicle control/brake control 22 executes the flow found in FIG. 3, and proceeds to block 72. As indicated in block 72, if a yaw rate fault has been detected via the method illustrated in FIG. 2 (see block 58), the fault is registered with a control processor of vehicle control system 18 and vehicle control/brake control 22 is disabled (see block 76). Further, an indication that the control 22 has been disabled is preferably provided to the driver of the vehicle via the vehicle display 26 (see block 78), such as by an indicator light or other such type of indicator.

Similarly, with reference to block 74, if a lateral accelerometer 14 fault has been indicated (block 66 of FIG. 2) and registered with the control processor of system 18, the vehicle control/brake control 22 is disabled (see block 76). Similar to the yaw sensor fault check described above, the operator of the vehicle is notified as to the faulty condition of acceleration sensor 14 through a warning light, sound, or other type of indicator on a vehicle display 26 (see block 78). Of course, instead of disabling the system in the event of a fault in yaw sensor 12 and/or lateral acceleration sensor 14, it is contemplated that other results may occur. For example, in the event of such a sensor 12 and/or 14 fault, a different source/sensor could be used to regenerate the yaw rate signal and/or lateral acceleration signal, thereby keeping system 12 able.

With continued reference to FIG. 3 and with particular references to blocks 72 and 74, when no fault is detected in either or both of the yaw sensor 12 and lateral acceleration sensor 14, vehicle control/brake control 22 returns to block 70 through block 80.

Thus, the present invention avoids using wheel speed sensor differences (for example, between left and right wheel sensors). in performing the indicated fault detection, thereby avoiding any vehicle brake 24 actuated false signal that may otherwise occur in the prior art. In other words, absent the teachings according to the present invention the wheel speed differences may otherwise be biased due to the vehicle's own actuation system. In keeping with the teachings of the present invention, this biased signal is avoided and also, fault is detected regardless of its brake actuation. The present invention is also able to detect signal fault that is not detectable by checking electrical specifications (which specify the operating range of the magnitude of bias change or its drift rate, as those terms are used in the art.) Accordingly, the present invention provides fault detection that is designed to detect faults independent of their specific fault types. For example, the detection method does not need to recognize a fast drift rate or bias change in order to detect fault. It is also noted that the constants disclosed herein are empirically determined constants.

Various modifications and variations will no doubt occur to those skilled in the arts to which this invention pertains. For example, the particular sensors used in conjunction with the disclosed system may be varied from those herein, as there are numerous possible methods for measuring or estimating the yaw rate, longitudinal velocity and lateral acceleration of a vehicle. Additionally, the method may be effected with changes to the transfer functions and numerical values of the various thresholds described above while remaining within the calculational and logic flow scheme described herein. These and all other variations which basically rely on the teachings to which this disclosure has advanced the art are properly considered within the scope of this invention as defined by the appended claims.

What is claimed is:

1. A method for detecting a signal fault in a motion sensor for a motor vehicle, the method comprising:

providing a lateral acceleration signal for the motor vehicle;

determining a first estimated value for road bank angle based on the lateral acceleration signal and at least one additional non-yaw rate vehicle motion signal;

providing a yaw rate signal for the motor vehicle;

determining a second estimated value for road bank angle based on the yaw rate signal and at least one additional non-lateral acceleration vehicle motion signal;

determining a first maximum estimated value based on the first estimated value;

determining a second maximum estimated value based on the second estimated value;

calculating a first threshold based on the first maximum estimated value;

calculating a second threshold based on the second maximum estimated value;

comparing whether the first estimated value exceeds the second threshold, and if so, indicating a lateral acceleration signal fault; and comparing whether the second estimated value exceeds the first threshold, and if so, indicating a yaw rate signal fault.

2. The method of claim 1 wherein:

determining the maximum first estimated value includes calculating a rolling maximum first estimated value which is continuously updated in a predetermined time period; and determining the maximum second estimated value includes calculating a rolling maximum second estimated value which is continuously updated in a predetermined time period.

3. The method of claim 1 further comprising:

providing a steering wheel angle signal; and calculating the first and second estimated values using the steering wheel angle signal.

4. The method of claim 1 further comprising:

determining whether the vehicle is stable by a function characterized as a product of (a) the difference between a front slip angle and a rear slip angle and (b) its time rate of change, wherein the vehicle is determined to be stable when the product is less than a calibrated threshold.

5. The method of claim 1 wherein:

comparing whether the first estimated value exceeds the second threshold includes generating a first counter increment when the first estimated value exceeds the second threshold, and indicating a lateral acceleration signal fault when the first counter exceeds a predetermined first counter threshold; and wherein, comparing whether the second estimated value exceeds the first threshold includes generating a second counter increment when the second estimated value exceeds the first threshold, and indicating a yaw rate signal fault when the second counter exceeds a predetermined second counter threshold.

6. The method of claim 1 wherein the measured lateral acceleration signal is provided by a lateral acceleration sensor, and wherein the measured yaw rate signal is provided by a yaw rate sensor.

7. A method for fault based detection of vehicle motion sensors for a motor vehicle comprising:

determining a first signal corresponding to a lateral acceleration signal;

determining an estimated first road bank value in accordance with said first signal;

determining a second signal corresponding to a yaw rate signal;

determining an estimated second road bank value in accordance with said second signal;

storing a maximum first road bank value determined from said estimated first road bank value;

storing a maximum second road bank value determined from said estimated second road bank value;

calculating a first threshold using the maximum first road bank value, the first threshold for performing a check of the second signal;

calculating a second threshold using the maximum second road bank value, the second threshold for performing a check of the lateral first signal;

determining whether the estimated first road bank value is greater than the second threshold, and if so, increasing a first counter thereby increasing the possibility of a lateral acceleration signal fault;

determining whether the estimated second road bank value is greater than the first threshold, and if so, increasing a second counter thereby increasing the possibility of a yaw rate signal fault;

indicating the lateral acceleration signal fault if said first counter is greater than a predetermined first counter threshold; and indicating the yaw rate signal fault if said second counter is greater than a predetermined second counter threshold.

8. The method of claim 7 further comprising:

determining whether a vehicle is stable by a function characterized as a product of (a) the difference between a front slip angle and a rear slip angle and (b) its time rate of change, wherein the vehicle is determined to be stable if the product is less than a calibrated threshold.

9. The method of claim 7 wherein storing the maximum first estimated road bank value includes calculating a rolling maximum second road bank value which is continuously verified and updated in a predetermined time period; and storing the maximum second estimated road bank value includes calculating a rolling maximum second road bank value which is continuously verified and updated in a predetermined time period.

10. The method of claim 7 wherein the lateral acceleration signal is provided by a lateral acceleration sensor, and wherein the yaw rate signal is provided by a yaw rate sensor.

11. A method for fault based detection of vehicle motion sensors for a motor vehicle comprising:

generating a first signal corresponding to a lateral acceleration signal of the motor vehicle;

calculating a first estimated value dependent on the first signal, the first estimated value corresponding to an estimated first road bank angle;

generating a second signal corresponding to a yaw rate signal of the motor vehicle;

calculating a second estimated value dependent on the second signal, the second estimated value corresponding to an estimated second road bank angle;

storing a first rolling maximum estimated value of the calculated first estimated value which is updated in a first predetermined time interval;

storing a second rolling maximum estimated value of the calculated second estimated value which is updated in a second predetermined time interval;

calculating a first threshold using the first rolling maximum, the first threshold for detecting fault in the yaw rate signal;

calculating a second threshold using the second rolling maximum, the second threshold for detecting fault in the lateral acceleration signal;

determining whether the first estimated value is greater than the second threshold, and if so, generating an incremental signal to a first counter thereby increasing the possibility of a lateral acceleration signal fault;

determining whether a vehicle is stable by a function characterized as a product of (a) the difference between a front slip angle and a rear slip angle and (b) its time rate of change, wherein the vehicle is determined to be stable when the product is less than a calibrated stability threshold;

indicating the lateral acceleration signal fault if said first counter has a value which is greater than a predetermined first counter threshold and if the vehicle is determined to be stable;

determining whether the second estimated value is greater than the first threshold, and if so, generating an increment to a second counter thereby increasing the possibility of a yaw rate signal fault; and indicating the yaw rate signal fault if said second counter has a value greater than a predetermined second counter threshold.

12. The method of claim 11 wherein the lateral acceleration signal is provided by a lateral acceleration sensor, and wherein the yaw rate signal is provided by a yaw rate sensor.

* * * * *